United States Patent [19]

Ljung et al.

[11] 4,410,276
[45] Oct. 18, 1983

[54] RING LASER GYROSCOPE WITH DOPPLER MIRRORS

[75] Inventors: Bo H. G. Ljung, Wayne; John C. Stiles, Morris Plains, both of N.J.

[73] Assignee: The Singer Company, Little Falls, N.J.

[21] Appl. No.: 274,044

[22] Filed: Jun. 15, 1981

[51] Int. Cl.³ .............................................. G01C 19/64
[52] U.S. Cl. ........................................ 356/350; 372/94
[58] Field of Search ............................ 356/350; 372/94

[56] References Cited

U.S. PATENT DOCUMENTS

| 3,533,014 | 10/1970 | Coccoli et al. | 356/350 |
| 4,152,071 | 5/1979 | Padgorski | 356/350 |
| 4,281,930 | 8/1981 | Hutchings | 356/350 |
| 4,348,113 | 9/1982 | Bonfils | 356/350 |

*Primary Examiner*—Vincent P. McGraw
*Attorney, Agent, or Firm*—John C. Altmiller; T. W. Kennedy

[57] ABSTRACT

A ring laser gyroscope has at least two of its mirrors vibrated perpendicular to their reflective surfaces by equal and opposite amounts to maintain the total beam path length constant. The amplitude of vibration causes the beams to be shifted across surfaces of all of the mirrors by a distance that is at least close to a Bessel zero distance so as to reduce the intensity of back scattered radiation at the main wavelength to a value close to zero. For an equilateral triangular ring laser gyroscope, two of the mirrors are vibrated between about 0.66λ and 0.74λ, optimally about 0.71λ. For an isosceles triangle having vibrating mirrors at two vertexes having angles of about 51.65°, the magnitude of vibration should be about 0.91λ.

8 Claims, 5 Drawing Figures

RING LASER GYROSCOPE WITH DOPPLER MIRRORS

This invention relates to the avoidance of lock-in in ring laser gyroscopes due to back scattered radiation from the mirrors. In particular, it relates to the avoidance of such lock-in by moving certain mirrors of a gyroscope synchronously and in directions perpendicular to their respective surfaces.

In ring laser gyroscopes two beams of monochromatic light traverse a closed optical path in opposite directions. The path encloses an area of a plane, and if the gyroscope is caused to pivot or rotate about a proper axis, that is, an axis that has a component normal to the plane, the velocity of one of the beams will be decreased and that of the other increased. According to the doppler effect, this causes the frequency of one of the beams to be reduced and that of the other increased. By comparing the frequencies of the oppositely directed beams, the direction and rate of rotation about the axis can be calculated. Techniques for generating and comparing the waves are well-known and need not be described herein.

Unfortunately, if the rate of rotation of the ring laser gyroscope is extremely slow, the frequencies of the beams have been found to lock together to a single frequency. As a result, the slowly rotating gyroscope produces the same output signal as if the gyroscope were stationary. It is desired to minimize the lock-in so as to be able to measure a rate of rotation as low as 0.001° per hour but the effect of lock-in makes it difficult to measure rates of rotation less than about 100° to 300° per hour. That means that an aircraft in which navigation depended on a ring laser gyroscope subject to lock-in could be diverted off course almost enough to make a full circle within an hour without any indication from the gyroscope that such drift was taking place.

The operation of a laser, which is fundamental to operation of a ring laser gyroscope, is based on the reinforcing effect of oscillations at frequencies in the visible range as waves of the radiation are reflected through a region in which energy is added in the proper phase relationship. In a ring laser gyroscope each beam of light is reflected by a series of mirrors one after another around a closed, polygonal, optical path, usually a three-sided or four-sided path. It is desirable that the light be entirely reflected from the surface of the mirror at each vertex of the polygon, but unfortunately the reflective surfaces are not perfect and a small amount of the light is scattered backward from microscopic scattering centers in each surface. The back scattered light transfers energy to the wrong wave, thereby providing too much coupling between the two waves traveling in opposite directions and causing both of them to have exactly the same frequency. This is the locked-in condition.

One way that has been tried heretofore to avoid lock-in is to produce a mechanical pivoting motion of the gyroscope to produce the same effect as if the gyroscope were pivoted back and forth about a proper axis. Such back and forth pivoting, known as dithering, is described in U.S. Pat. No. 3,373,650, and if the gyroscope can be dithered at a rate that will cause the beams to have a frequency difference of several hundred hertz they will not be locked-in, even if the vehicle in which the gyroscope is mounted rotates very slowly about a proper axis.

However, mechanical dithering requires that the gyroscope be halted twice each cycle, at each extreme of its pivotal movement, and when it is halted, or nearly so, it is possible for lock-in to take place, at least briefly.

Another way to reduce or avoid lock-in is to use a Faraday medium to bias the two laser beams by direct frequency separation, as is also described in U.S. Pat. No. 3,373,650.

Still another way of avoiding lock-in is to introduce into the closed circuit path a beam of energy equal in amplitude but opposite in phase to the sum of undesired reflections. U.S. Pat. No. 3,323,411 describes apparatus for doing so.

U.S. Pat. No. 3,627,422 describes yet another way of avoiding lock-in by modulating the two waves to shift their frequencies equally and oppositely. The modulating means described for achieving that result are either an acoustic shutter, a light shutter or an electro-optic crystal.

The disadvantages of mechanical dither and direct frequency separation by a Faraday medium are discussed in U.S. Pat. No. 3,879,130, which uses two cavities to generate oppositely directed waves of different frequencies.

U.S. patent application Ser. No. 157,765, filed June 9, 1980, entitled "Phase Modulated Mirror For A Ring Laser Gyroscope," and assigned to the same assignee as the present case discloses a method and apparatus for avoiding lock-in by vibrating each mirror in a ring laser gyroscope from side to side an extremely small amount in its own plane without pivoting the basic gyroscope at all. The instantaneous intensity of the back scattered radiation is modified in the same way as if the phase of that radiation were modulated. The equation for the instantaneous intensity can be solved using Bessel functions, and the argument of the Bessel functions is proportional to the distance each mirror is moved. By selecting the magnitude of motion of the mirrors to have certain values that correspond to zeros of the Bessel function, the intensity of the main back scattered radiation can be reduced to zero. This shifts all of the energy of the back scattered radiation to harmless side bands separated from the carrier frequency by integral multiples of the frequency of vibration, thereby minimizing or avoiding lock-in.

Vibrating all of the mirrors in planes parallel to their respective surfaces requires a relatively complex driver at each vertex: three for a triangular ring laser gyroscope, four for one having four sides, etc. In addition, at least one mirror movable along a bisector of one vertex, i.e., perpendicular to the plane of the mirror, is required to allow control of the length of the total optical path around the ring to adjust for expansion due to heat and for other effects that cause improper operation.

OBJECTS AND SUMMARY OF THE INVENTION

One of the objects of the present invention is to reduce or eliminate lock-in in a ring laser gyroscope by vibrating mirrors of the gyroscope in a direction perpendicular to their reflective surfaces.

Another object is to provide improved apparatus for minimizing or eliminating lock-in by doppler vibration of two reflectors of a ring laser gyroscope while maintaining a constant path length of the laser beams around the ring.

A still further object of the present invention is to provide an improved method of reducing or eliminating lock-in in a triangular ring laser gyroscope by vibrating two of its three mirrors, the direction and extent of vibration being such as to maintain the total path length substantially constant while shifting the location of at least two of the path segments transversely to displace their intersections with each other and with the third path segment at the locations of the mirrors by an amount corresponding at least substantially to a zero of the appropriate Bessel function.

In the case of an equilateral triangular optical path, the mirrors at two of the three vertex angles can be vibrated synchronously, but in opposite directions relative to the interior of the triangular area bounded by the optical path, so that one of the vibrating mirrors moves toward the interior of the area along a bisector of the vertex angle at that mirror while the other moves away from the area along the bisector of its vertex angle. The third mirror can be held fixed and the magnitude of vibration chosen so that the location of impingement of the light beams will be shifted at some of the mirrors by an amount close to the amount that corresponds to a Bessel function zero.

The possibility of lock-in in an equilateral triangular ring laser gyroscope can be further minimized by proper selection of the amplitude of vibration to a value nearly equal to a Bessel function zero but slightly displaced therefrom at all of the mirrors to achieve a balanced minimum of total back scattered radiation.

The intensity of back scattered radiation can be reduced substantially to zero at all three reflective surfaces by constructing the gyroscope as an isosceles triangle, rather than an equilateral one, with the two symmetrical mirrors arranged to reflect the light at an angle such that equal and opposite vibration of those two mirrors relative to the area within the triangle can be carried out at an amplitude that corresponds exactly to one Bessel function zero while the third angle, supplementary to, but different from, the first two angles, is selected so that the displacement of the point of reflection on that reflector surface will correspond to another Bessel function zero.

The invention will be described in greater detail in the following written description together with the drawings.

DETAILED DESCRIPTION OF THE INVENTION

Figure 1:
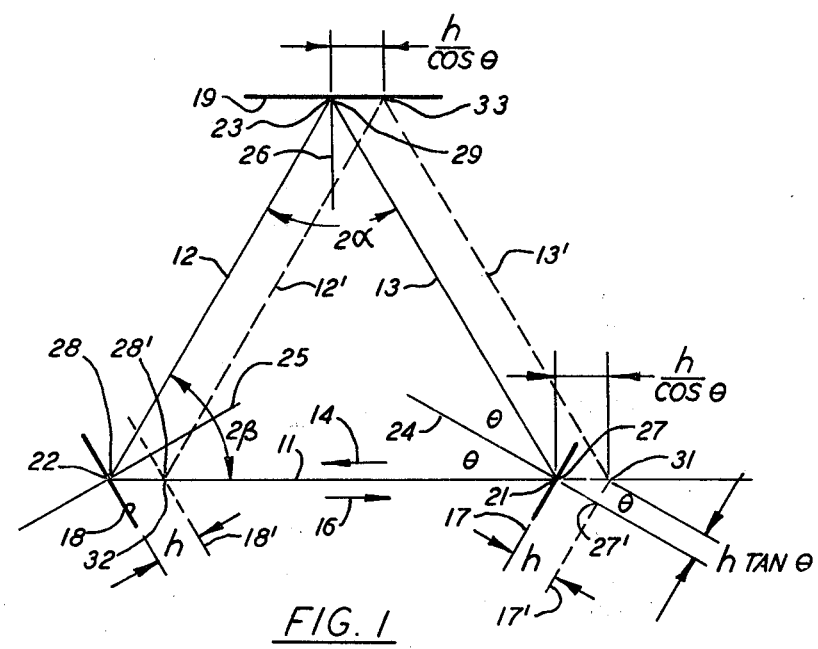
FIG. 1 is an optical diagram illustrating the application of the invention to a triangular ring laser gyroscope.

FIG. 1 shows a simplified optical diagram of a triangular ring laser gyroscope. In accordance with current practice, such a gyroscope would be constructed by creating a triangular tubular cavity in a suitable block of solid material, filling the cavity with a suitable lasing material, such as a mixture of helium and neon, and energizing the lasing material by electric power applied to electrodes located in the wall of the cavity. All of these components are well-known, as is their mode of operation for producing two oppositely directed monochromatic beams of electromagnetic radiation in a part of the electromagnetic spectrum depending on the nature of the lasing material. Therefore, no detailed description of those components and other components for extracting radiation from the two beams and measuring the radiation from one of the beams in comparison with that from the other need be given. What is important in the present invention is the optical arrangement for minimizing back scattered radiation from the mirrors, or avoiding it altogether, so as to minimize or avoid having the oppositely directed beams locked together to a common frequency.

The optical diagram in FIG. 1 shows three rays 11–13, each representing two laser beams traveling in opposite directions 14 and 16 around a triangular path within a ring laser gyroscope that includes three mirrors 17–19. The rays 11–13 may be considered to be axial rays of three bundles of light having a somewhat greater thickness than is represented by the individual rays 11–13.

The three vertexes 21–23 of the triangular path are determined by the locations of the three mirrors 17–19. In order to simplify the mathematical analysis, the vertex angle between the rays 11 and 13 is identified as $2\theta$, the vertex angle between the rays 11 and 12 as $2\beta$, and the vertex angle between the rays 12 and 13 as $2\alpha$. In isosceles triangles to be discussed in the following description, it will be assumed that $2\beta = 2\theta$. In equilateral triangles, $2\beta = 2\theta = 2\alpha = 60°$.

In order for the mirrors 17–19 to reflect the rays 11–13 along the paths shown, these mirrors must be placed so as to be perpendicular to the respective bisectors 24–26 of the vertex angles. Thus, at the vertex 21 where the rays 11 and 13 intersect the reflective surface of the mirror 17, the angle of incidence of the wave traveling in the direction 14 is the same as that of the wave traveling in the direction 16, namely $\theta$, and the angle of reflection of each of these waves is also $\theta$. At the vertex 22 the angles of incidence and reflection are each $\beta$ and at the vertex 23 the angles of incidence and reflection are each $\alpha$.

Although every attempt is made to polish the reflective surfaces of the mirrors 17–19 as perfectly as possible, some imperfections remain. These imperfections are microscopic in size but are still large enough to cause the scattering of light rays, such as the rays 11–13, impinging on those mirrors. The total amount of scattering is quite small, but there is some scattering in the reverse direction at each vertex. This means that, for a wave traveling along the ray 11 in the direction 16, the back scattered radiation would be in the same direction as the forward direction of a wave traveling along the ray 11 in the direction 14. Although the imperfections that produce back scattering are spread across the surface of each of the mirrors, they may be treated as if they were concentrated at one point on each mirror, such as the point 27 on the mirror 17, the point 28 on the mirror 18, and the point 29 on the mirror 19.

In U.S. patent application Ser. No. 157,765, supra, it was shown that sliding the mirrors, corresponding to the mirrors 17–19 of the present application, laterally from side to side in the planes of their reflective surfaces could cause cancellation of the main back scattered ray at each mirror if the distance each mirror moved was properly chosen.

According to the present invention, lateral displacement of the location of the main scattering center on the mirror 17, for example, by a certain amount can be achieved by moving that mirror along its perpendicular bisector 24, but it will be shown in the following description that the distance of movement of the mirror is different from the distance required when the movement of the mirror is lateral. Furthermore, it is only necessary to move two of the mirrors 17 and 18 instead of all three, as in Ser. No. 157,767, to achieve a substantial or even total reduction of the main back scattering energy at all three of the mirrors.

In order to keep the three beams of light defined by the rays 11–13 properly compact, the reflective surface of the mirror 19 is actually spherical rather than planar, as the surfaces of the mirrors 17 and 18 are, but the radius of curvature of the reflective surface of the mirror 19 is typically several meters, which is much longer than the lengths of the rays 11–13. Therefore, the mirror 19 may be treated mathematically as if it were planar like the other two.

It is essential that the total optical path length around a ring laser gyroscope be held at a fixed value at all times. Thus, it is not possible to move the mirror 17, alone, in a direction perpendicular to its surface, but it is sufficient to move the two mirrors 17 and 18 synchronously in opposite directions relative to the area bounded by the rays 11–13 and perpendicular to the respective surfaces of those mirrors. If the mirror 17 is moved outwardly a distance h along the bisector 24 to the location 17', the mirror 18 must be moved inwardly along the bisector 25 to the position 18'. This causes the ray 11 to shift longitudinally to the right along its original path but displaces the rays 12 and 13 laterally to the paths 12' and 13', respectively. It also moves the back scattering centers 27 and 28 to the locations 27' and 28' where they are no longer on the ray 11 but are still within the areas of the mirrors 17 and 18 covered by the entire beam of which the ray 11 is only the central part. In fact, the ray 11 now impinges on the mirror at the location 17' at a point 31 that is displaced from the new location 27' of the scattering center by a distance h tan θ. In order to do this, the ray 11 has to travel an extra distance h/cos θ. The rays 11 and 12 meet at the point 32 on the shifted mirror at location 18' and the rays 12 and 13 meet at the point 33 on the mirror 19. Assuming that the rays 11–13 form an equilateral triangle, which is the usual configuration of a triangular ring laser gyroscope, the reflective surface of the mirror 19 will be parallel to the ray 11, and the distance between the original location of the scattering center 29 prior to movement of the mirrors 17 and 18 and the point 33 will also be equal to h/cos θ. This relationship is true even if the rays 11–13 form only an isosceles triangle rather than equilateral triangle, provided the vertex angle 2β is equal to the vertex angle 2θ.

Figure 2:
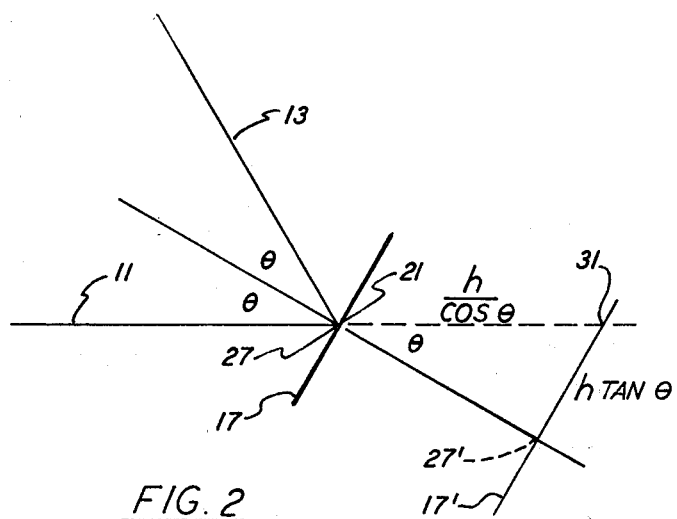
FIG. 2 is an enlargement of one corner of the diagram in FIG. 1 to make the geometric relationships more easily visible.

FIG. 2 shows the geometrical and phase relationships associated with moving the mirror 17 a distance h along the perpendicular bisector 24. A wave front of light traveling to the right in the direction 16 along the path 11 would have had a phase angle φ at the scattering center 27 with the mirror 17 in its original position. Part of the radiant energy of this wave would have been reflected back in the direction 14 along the same path 11. Shifting the mirror 17 to the position 17' (and the mirror 18 correspondingly to keep the path length constant) would shift the scattering center to a corresponding new location 27', still on the bisector 24, which is assumed to pass through the mirror at the location of the vertex angle 21. It would also shift the entire beam, of which the ray 11 is only one ray, to the right by a distance h/cos θ so that the wave front, which continues to reach the location 31 with the same phase φ, would reach the location of a plane passing through the location 27, and perpendicular to the ray 11, with a different phase, due to having to travel a distance that is shorter by an amount (h tan θ) sin θ, which may simply be called Δχ, i.e., $$\Delta\chi = (h \tan \theta) \sin \theta \tag{1}$$

The phase of the back scattered wave changes by an amount proportional to twice that distance, or 2Δχ.

The change of phase, Δφ, that takes place when the back scattered wave traverses a distance 2Δχ is determined by the wavelength λ of the radiant energy according to the equation:

$$\Delta\phi = 2\Delta \times \left(\frac{2\pi}{\lambda}\right) \tag{2}$$

It should be noticed that the same magnitude of phase change takes place with respect to back scattered waves that traverse the ring laser gyroscope in the opposite direction.

This is exactly the same phase change that takes place in laterally shifted mirrors as described in application Ser. No. 157,765 referred to previously, but due to the fact that the mirror 17 in the present case is moved perpendicularly to its plane, the distance is different from the lateral shift distance since the apparent lateral shift of the scattering center from the location 27' to the location 31 is h tan θ. Since the mirror moves sinusoidally at a frequency Ω and with a maximum excursion of H from a rest position, the instantaneous distance h is:

$$h = H \sin \Omega t \tag{3}$$

Thus, the apparent lateral shift of the scattering center at any instant is H tan θ sin Ωt. Substituting the value of h from equation (3) into equation (1) gives:

$$\Delta\chi = H \sin \Omega t \tan \theta \sin \theta \tag{4}$$

Substituting this value of Δχ into equation (2) gives $$\Delta\phi = \frac{4\pi H}{\lambda} \tan\theta \sin\theta \sin\Omega t \tag{5}$$

Since H and θ do not vary with time, the whole coefficient of sin Ωt may be set equal to a constant β. That is:

$$\Delta\phi = \beta \sin \Omega t \tag{6}$$

in which $$B = \frac{4\pi H}{\lambda} \tan\theta \sin\theta \tag{7}$$

In an equilateral triangle ring laser gyroscope, θ is 30°, sin θ is ½, and tan θ is 0.577. Thus $$B = \frac{.577 \times 6.28H}{\lambda} = \frac{3.62H}{\lambda} \tag{8}$$

The scattered wave has an instantaneous amplitude e given by $$e = E \sin(\omega t \Delta\phi) \tag{9}$$

in which E is the magnitude and $\omega$ is the angular frequency of the radiation. Substituting the value of $\Delta\phi$ from equation (6) into equation 9 gives:

$$e = E \sin(\omega t \beta \sin \Omega t) \tag{10}$$

which is the same as the well-known equation for phase modulation of a carrier, having an angular frequency $\omega$, by a modulating wave having an angular frequency $\Omega$. Equation (10) when expanded in Bessel functions $J_n(B)$, becomes:

$$e = E\{J_0(B) \sin \omega t + J_1(B)[\sin(\omega+\Omega)t - \sin(\omega-\Omega)t] + J_2(B)[\sin(\omega+2\Omega)t + \sin(\omega-2\Omega)t] + J_3(B)[\sin(\omega+3\Omega)t - \sin(\omega-3\Omega)t] + \ldots \tag{11}$$

Jo(B), in which Jo is a Bessel function of the first kind and of order O and B is its argument, represents the amplitude of an unmodified electromagnetic wave that would be called the carrier in frequency modulation of a radio frequency wave. It is well-known that Jo(B) becomes zero, i.e., the amplitude of the carrier drops to zero, when the argument B has any one of certain values:

$$B = 2.405$$
$$B = 5.520$$
$$B = 8.654$$
$$B = 11.791 \tag{12}$$

The importance of those values of the argument B in the present case is that they are values at which the amplitude of the unmodulated frequency of the back scattered wave at the mirror 17 reduces to zero. By selecting B to be any of these values, also known as zeros of the Bessel function of the first kind and order zero, the effect of the unmodified back scattered wave becomes zero, and the only back scattered energy is in the sidebands, which are separated from the unmodified wave by integral multiples of $\Omega$. The angular frequency $\Omega$ may be selected high enough so that the energy in the sidebands will not lock in with the main wave traveling in the same direction.

A value of H that will cause the amplitude of the unmodified, or carrier, back scattered wave to vanish can be calculated from equations (7) and (8). For convenience these equations may be rewritten as:

$$H = \frac{B\lambda}{4\pi \tan\theta \sin\theta} \tag{13}$$

and $$H = \frac{B\lambda}{3.62} \tag{14}$$

The value of $\lambda$ depends on the lasing material, and a gas commonly used in lasers is a mixture of helium and neon that produces radiation having a wavelength $\lambda$ of $6.328 \times 10^{-7}$ m. Substituting this value in equation (14) and simultaneously setting B equal to each of the values listed in equations (12) identifies the four lowest values of H for which the fundamental back scattered wave will vanish. These are:

$$H = 4.204 \times 10^{-7} \text{ m}$$
$$H = 9.649 \times 10^{-7} \text{ m}$$
$$H = 15.128 \times 10^{-7} \text{ m}$$
$$H = 20.611 \times 10^{-7} \text{ m} \tag{15}$$

When H has any of the values in equations (15) the only back scattered radiation from the mirror 17 will be in the sidebands.

Alternatively, the value H at which the amplitude of the fundamental back scattered radiation vanishes can be stated in terms of the wavelength $\lambda$ to accommodate ring laser gyroscopes in which a different lasing material is used. Thus, for the four values of B in equations (12), H can be:

$$H = 0.66\lambda$$
$$H = 1.52\lambda$$
$$H = 2.39\lambda$$
$$H = 3.25\lambda \tag{16}$$

Since the identical conditions prevail at the mirror 18 in FIG. 1, there will be no back scattered radiation from that mirror, either, except in the sidebands.

However, the conditions at the mirror 19 in FIG. 1 are different. There the displacement of the beams 12 and 13 does not have a maximum value, or amplitude, of H tan $\theta$, as is true at the mirrors 17 and 18, but an amplitude of H/cos $\theta$. Still assuming a right triangle in which $\theta$ is 30°, H/cos $\theta$ is the hypotenuse and is twice as long as the shorter side, H tan $\theta$. This means that the vertex 23 shifts twice as far from its original point on the mirror 19 as the vertex does on the mirror 17 when the mirror 17 is moved a distance H along the bisector 24. The significance of this can be understood by referring to FIGS. 3 and 4.

Figure 3:
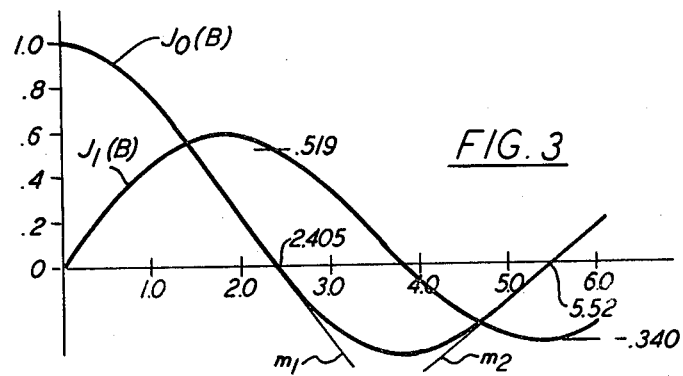
FIG. 3 is a graph of Bessel functions of the first kind and the first and second orders.

FIG. 3 consists of graphs of the zero order and first order Bessel functions $J_0(B)$ and $J_1(B)$ from B=0 to B=6. This range includes the two lowest values of B for which $J_0(B)$ is zero: B=2.405 and B=5.52. When the amplitude H is 0.66 and the maximum excursion of H tan $\theta$ is 0.66$\lambda \times$(0.577), which makes B equal to 2.405 and $J_0(B) = 0$ at the mirrors 17 and 18, the amplitude of H/cos $\theta$ at the mirror 19 will be 0.66$\lambda \times$(1.154), and B will be equal to 4.81. This point is indicated on FIG. 3. Fortunately, the nature of the Bessel function is such that this point is not far from the next zero of this Bessel function at B=5.52.

Figure 4:
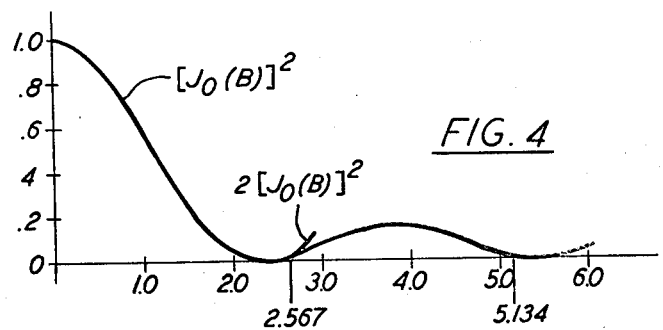
FIG. 4 is a graph of the square of a Bessel function of the first kind and first order.

The intensity of energy in the back scattered wave is proportional to the square of the Bessel function, and the relationship of $[J_0(B)]^2$ as a function of B is plotted in FIG. 4. As may be seen there, the back scattered energy when B=4.81 is quite low and, thus, setting H to eliminate completely the back scattered energy from the mirrors 17 and 18 by causing B to be at the lowest zero point of $J_0(B)$ also causes the back scattered energy of the carrier frequency from the mirror 19 to be greatly reduced.

An alternative is to set H at a value that will cause H/cos $\theta$ at the mirror 19 to make B be 5.52, the second zero of $J_o(B)$. Because of the previously described 2:1 relationship between $h/\cos\theta$ and $h\tan\theta$ when $\theta=30°$, the value for B at the mirrors 17 and 18 will be one-half of 5.52, or 2.76. Putting this value of the argument B in equation (14) gives $$H = 0.74\lambda \tag{17}$$

As may be seen in FIGS. 3 and 4, $J_o(2.76)$ is only a little higher than zero, and the intensity of back scattered energy from the mirrors 17 and 18 under such condition will be greatly reduced from the intensity at B=0. However, it must be kept in mind that the back scattered energy is from two mirrors 17 and 18, not just one mirror as was the case when B was 2.405 under the previously described conditions.

The optimum reduction in back scattered energy in an equilateral triangular ring laser gyroscope is to select a point B=a and a corresponding point B=2a to cause the sum of back scattered intensities to be a minimum. Assuming that the sum is represented by the letter Q, and keeping in mind that the energy contributions from the mirrors 17 and 18 are equal, $$Q = 2[J_o(a)]^2 + [J_o(2a)]^2 \tag{18}$$

The value of a that makes Q a minimum is obtained by differentiating Q with respect to a, setting the result equal to 0, and solving for a. This can be simplified by recognizing that the values of $J_o(a)$ and $J_o(2a)$ are approximately equal to the slopes $m_1$ and $m_2$ of the Bessel function $J_o(B)$ at the respective zeros B=2.405 and B=5.52 times the respective differences between 5.52 and 2a and between a and 2.405. Thus $$J_o(a) = m_1(a - 2.405) \tag{19}$$

and $$J_o(2a) = m_2(5.52 - 2a) \tag{20}$$

This takes into account that a will be slightly greater than 2.405 and 2a will be slightly less than 5.52. Putting the values of $J_o(a)$ and $J_o(2a)$ from equations (19) and (20) into equation (17) gives:

$$Q = 2m_1^2(a-2.405)^2 + m_2^2(5.52-2a)^2 \tag{21}$$

It is well-known that the slope of a Bessel function $J_n(B)$ of order n at any point B is the negative value of the Bessel function $J_{n+1}(B)$ of the next higher order n+1 at the same point B. This makes it unnecessary to differentiate $J_o(B)$ at B=2.405 and B=5.52. Instead, it is only necessary to look up the values of $J_1(B)$ at those two values of B in a table of Bessel functions or on the graph of $J_1(B)$ in FIG. 3. This shows that $J_1(2.405)$ is 0.519 and $J_1(5.52)$ is $-3.40$. The slopes $m_1$ and $m_2$ are the negatives of these numbers.

Substituting these values for $m_1$ and $m_2$ in equation (21) gives:

$$Q = 2(-0.519)^2(a-2.405)^2 + (0.340)^2(5.52-2a)^2 \tag{22}$$

$$Q = 0.539(a^2 - 4.18a + 5.78) + 0.116(30.47 - 22.08a + 4a^2) \tag{23}$$

$$Q = 1.003a^2 - 5.150a + 6.650 \tag{24}$$

Now differentiating Q with respect to a and setting the result equal to 0 gives:

$$dQ/da = 2.006a - 5.15 = 0 \tag{25}$$

$$a = 5.15/2.006 = 2.567 \tag{26}$$

$$2a = 5.134 \tag{27}$$

In order to make B in equation (14) be equal to a, which is 2.567, $$H = (2.567/3.62)\lambda = 0.71\lambda \tag{28}$$

which is slightly greater than the amplitude of vibration of the mirrors 17 and 18 that would reduce back scattered radiation (at the equivalent of the carrier frequency) to zero.

Assuming $\lambda = 632.8$ nm, equation (28) may be written as:

$$H = 4.49 \times 10^{-7} \tag{29}$$

which is the value for H that reduces the total back scattered radiation from all three mirrors 17–19 by a factor of approximately 100. This value for H is, of course, not precisely accurate, since several approximations have been used in deriving it, but it is substantially the optimum value for H.

Instead of using an equilateral triangle of tubes or channels of lasing material along which the rays 11–13 in FIG. 1 travel, it is possible to select the angle $2\theta$ (which is equal to $2\alpha$) different enough from the angle $2\alpha$ so that the effective shift $h\tan\theta$ of the vertex 21 on the mirror 17 (and of the vertex 22 on the mirror 18 will result in making B=2.405 and simultaneously will shift the vertex 23 on the mirror 19 by an amount $h/\cos\theta$ that will correspond to B=5.52, thereby simultaneously reducing the main back scattered radiation from all three mirrors 17–19 to zero. Thus, by making the ratio of $h\tan\theta$ to $h/\cos\theta$ equal to the ratio of 2.405 to 5.52, it can be shown that:

$$\frac{h\tan\theta}{\frac{h}{\cos\theta}} = \frac{2.405}{5.52} \tag{30}$$

reduces to $$\sin\theta = 0.4357 \tag{31}$$

so that $$\theta = 25.825° \tag{32}$$

The two vertex angles 21 and 22 are each equal to $2\theta$, or 51.65°, and the vertex angle $2\alpha$ is, therefore, 76.7°.

Inserting this value for $\theta$ in equation (13) and setting the argument B at the value 2.405 gives $$H = \frac{2.405\lambda}{4\pi(.4839)(.4357)} = .91\lambda \tag{33}$$

When the three angles of an isosceles triangular ring laser gyroscope in FIG. 1 have vertex angles 21 and 22 of 51.65°, each, and vertex angle 23 of 76.7° and the mirrors 17 and 18 at the vertexes 21 and 22 are vibrated sinusoidally and synchronously but in opposite directions along their respective perpendicular bisectors 24 and 25 by a distance h; where $$h = 0.91\lambda \sin \Omega t \tag{34}$$

and $\lambda$ is the monochromatic wavelength of radiation generated by the lasing medium, back scattered radiation at that wavelength from all three of the mirrors 17–19 will be substantially entirely eliminated. The back scattered radiation will be in the side bands, but by making $\Omega$ sufficiently large, the sidebands can be displaced far enough from the carrier frequency so that lock-in will also be substantially entirely eliminated.

Figure 5:
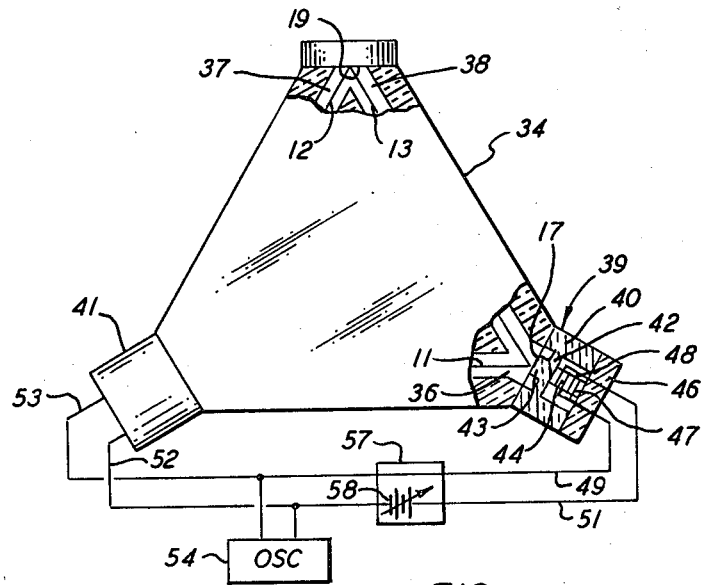
FIG. 5 is a simplified cross-sectional representation of an actuator for vibrating the mirrors in the embodiment in FIG. 1.

FIG. 5 shows, in greatly simplified form, a cross-sectional view of a triangular ring laser gyroscope constructed according to this invention. A block 34 of suitable material, such as quartz, has three channels 36–38 bored in it. The three rays 11–13 are formed substantially along the center lines of these channels, and the fixed mirror 19 at the intersection of the channels 37 and 38 is attached to the block 34 by any suitable means to reflect the rays 12 and 13. The mirror 17 that reflects the rays 11 and 13 is held by a driver 39, and a similar driver 41 holds the mirror 18, which is not shown in this figure.

The driver 39 consists of a block 40 of suitable material, such as quartz, machined out to form a thin membrane 42 that supports the mirror 17 at the end of a short central cylinder 43. On the other side of the membrane 42 from the cylinder 43 is a stack of piezoelectric crystal slabs 44 held in place between the membrane 42 and a rigid backstop 46 attached to the block 40. The piezoelectric crystals 44 have electrodes 47 and 48 on their opposite surfaces to be connected to a pair of terminals 49 and 51, respectively. Similar terminals 52 and 53 are connected to the driver 41.

The drivers 39 and 41 are actuated by a signal from an oscillator 54 that produces the modulating signal having the frequency $\Omega$ and is connected in one polarity to the terminals 49 and 51 of the driver 39 and in the opposite polarity to the terminals 52 and 53 of the driver 41 to provide equal and opposite output signals for the drivers 39 and 41. A path-length adjustment control 57 comprising, essentially, a variable direct voltage 58 is connected between the splitter 56 and the driver 39 to provide a DC bias on the crystals 44 to adjust the total length of the path comprising the rays 11–13. The voltage of the path-length control 57 is added to the output voltage of the oscillator 54 to cause the crystals 44 to expand and contract with the oscillations so as to vibrate the mirror 17 in a direction perpendicular to its reflective surface. Because of the way the mirror 17 is driven, it is convenient to use it for both path-length control and phase modulation of the rays 11–13.

This invention has been described in terms of specific embodiments, but it will be recognized by those skilled in the art that modifications may be made therein without departing from the true scope of the invention as defined by the following claims.

What is claimed is:

1. A method of preventing lock-in in a ring laser gyroscope that comprises a plurality of mirrors directing monochromatic beams of radiant energy of a predetermined frequency in opposite directions around a closed optical path, said method comprising vibrating first and second ones of the mirrors in first and second directions, respectively, to move the reflective surfaces of said first and second mirrors along first and second paths that include components perpendicular to the reflective surfaces of said first and second mirrors, respectively, while maintaining the total length of the closed optical path constant to diminish back scattered radiation from all of the mirrors, and in which the optical path is an isosceles triangle and a third mirror is held stationary and the distance that the first and second mirrors are vibrated is substantially equal and of a magnitude such that the combined energy in the back scattered radiation at said predetermined frequency from all three of the mirrors is reduced substantially to zero, and wherein each of said first and second mirrors is vibrated at an amplitude that shifts the region thereon struck by the light beams by a distance having a magnitude that corresponds to a zero of a Bessel function.

2. The method according to claim 1 wherein the first and second directions are substantially perpendicular to the reflective surfaces of the first and second mirrors and the amplitude H is equal to $$\frac{B\lambda}{4\pi \tan\theta \sin\theta}$$

wherein $\theta$ is the angle of incidence of the beams on each of the first and second mirrors, B is an argument for which the zero order Bessel function is zero, and $\lambda$ is the wavelength of the monochromatic radiant energy.

3. The method according to claim 2 in which the angle $\theta = 30°$ and H is within the range extending from approximately $0.66\lambda$ to $0.74\lambda$.

4. The method according to claim 3 in which H is approximately equal to $0.66\lambda$.

5. The method according to claim 3 in which H is approximately equal to $0.74\lambda$.

6. The method according to claim 3 in which H is approximately equal to $0.71\lambda$.

7. A ring laser gyroscope comprising laser means to produce two beams of monochromatic radiation at a predetermined wavelength traveling in opposite directions around a closed polygonal path of predetermined length enclosing an area bound by said path; a plurality of mirrors at vertexes of the path; and means to oscillate at least first and second ones of the mirrors synchronously in directions along the respective bisectors of the vertex angles at which the oscillated mirrors are located, the first mirror moving toward the area as the second mirror moves away from it to maintain the total path length fixed, and in which the polyon is a triangle having first, second, and third vertexes at first, second, and third mirrors, respectively, the means to oscillate comprising first and second driver means connected to the first and second mirrors respectively; and energizing means to supply oscillatory power to the first and second mirrors to move the first mirror toward the interior of the triangle, along a perpendicular bisector of the first vertex while moving the second mirror away from the triangle along a perpendicular bisector of the second vertex, and in which the triangle is an equilateral triangle, and in which the first and second vertexes are each substantially equal to 51.65° and the third vertex is substantially equal to 76.70°.

8. The invention as defined in claim 7 in which the energizing means supplies oscillator power to move the first and second mirrors synchronously, equally, and oppositely by distances of approximately $0.91\lambda$.

* * * * *